United States Patent [19]

Helfrich et al.

[11] Patent Number: 4,486,972
[45] Date of Patent: Dec. 11, 1984

[54] ANIMAL TRAP

[76] Inventors: Clarence M. Helfrich, 3310 Ingleside Dr., Parma, Ohio 44134; James C. Helfrich, Rte. 1, Fredericktown, Ohio 43019

[21] Appl. No.: 323,233

[22] Filed: Nov. 23, 1981

[51] Int. Cl.³ .......................................... A01M 23/26
[52] U.S. Cl. .......................................... 43/88; 43/92
[58] Field of Search .................... 43/88, 90, 92, 93, 96

[56] References Cited

U.S. PATENT DOCUMENTS

| | | |
|---|---|---|
| 419,587 | 1/1890 | Jameson . |
| 668,527 | 2/1901 | Levarn . |
| 860,639 | 7/1907 | Crago . |
| 877,134 | 1/1908 | Sprague ............... 43/93 |
| 1,176,670 | 3/1916 | Ergenbright ............... 43/92 |
| 1,458,286 | 6/1923 | Gibbs ............... 43/88 |
| 1,545,018 | 7/1925 | Smith ............... 43/88 |
| 1,572,358 | 2/1926 | O'Neil ............... 43/88 |
| 1,634,270 | 7/1927 | Samouce . |
| 1,672,051 | 6/1928 | Beardsley . |
| 1,862,580 | 6/1932 | Pneuman . |
| 1,960,122 | 5/1934 | Pitre et al. ............... 43/88 |
| 1,961,075 | 5/1934 | McMullen ............... 43/88 |
| 2,020,153 | 11/1935 | Melvin . |
| 2,052,106 | 8/1936 | Myklebust . |
| 2,128,579 | 8/1938 | Corey . |
| 2,216,911 | 10/1940 | Hannold ............... 43/90 |
| 2,311,378 | 2/1943 | Galiano ............... 43/88 |
| 2,333,828 | 11/1943 | Taylor . |
| 2,489,095 | 11/1949 | Lienhard . |
| 2,543,826 | 3/1951 | Bigelow . |
| 2,713,745 | 7/1955 | Bruske . |
| 2,877,596 | 3/1959 | Elencik . |
| 3,206,886 | 9/1965 | Swanson . |
| 3,939,596 | 2/1976 | Webley . |
| 4,065,871 | 1/1978 | Loeffler . |
| 4,175,351 | 11/1979 | Souza . |

FOREIGN PATENT DOCUMENTS

| | | |
|---|---|---|
| 236400 | 12/1923 | Canada . |
| 922105 | 3/1973 | Canada . |

Primary Examiner—Kuang Y. Lin
Assistant Examiner—Kurt Rowan
Attorney, Agent, or Firm—Robert B. Watkins

[57] ABSTRACT

An animal trap utilizes a generally X-shaped base to provide a balanced mounting of a pair of U-shaped jaws, a pair of torsion coil springs, and elements of a trigger mechanism. When the trap is set, the jaws are pivoted downwardly relative to the base and lie in a horizontal plane surrounding a trigger pan, whereby the set trap is of minimal height. A means of adjustment is provided to enable the force required to operate the trigger pan to be adjusted through a wide range to accommodate the trap for use with a wide variety of animals. Mounting rods extend through two spaced coiled portions of each of the torsion coil springs to couple the springs securely to the base. The springs have U-shaped leg portions which engage sides of the jaws and bias the jaws toward their closed position. The U-shaped leg portions wedge the jaws together as the jaws approach their closed position, and prevent the jaws from being moved apart by a trapped animal. A connector couples with a central portion of the base to provide a "center-pull" tie-down.

5 Claims, 6 Drawing Figures

ANIMAL TRAP

BACKGROUND OF THE INVENTION

1. Field of the Invention

The present invention relates to a highly effective, spring-closed, leg trap for animals, and, more particularly, to a trap which employs an advantageously configured base to provide a balanced mounting on a pair of U-shaped jaws, a pair of torsion coil springs, and elements of a trigger mechanism.

2. Prior Art

Many proposals have been made in an effort to provide a versatile, reliable trap of the type employing a pair of pivotally mounted, spring-closed, U-shaped jaws. One problem with prior proposals has been the complexities of the trap structures that result when the proposals are implemented. Many previously proposed traps have included an unreasonably large number of intricate parts which have rendered the traps difficult to assemble and service, and expensive to fabricate.

A deficiency of most previous trap proposals has been a failure to recognize and address the desirability of providing a trap with a means for presetting the trap's trigger mechanism to require the application of a force of desired magnitude to spring the trap, whereby the trap can be preset for use with a wide variety of animals.

Another problem has related to the tendency of previously proposed traps to permit their jaws to re-open and release a trapped animal once the trap has been sprung and the trapped animal applies force in an effort to seek release.

A further problem has been a failure of many previously proposed traps to provide a blanced mounting of components of the trap relative to the trap's connection with a tie-down assembly, whereby the unbalanced weight of the trap ends to inflict undue injury on a trapped animal which is seeking to escape.

Still another problem with prior proposals has been their failure to provide a trap of sturdy design, the components of which can be scaled up or down in size as needed to provide traps of a variety of sizes for use with various animals.

SUMMARY OF THE INVENTION

The present invention overcomes the foregoing and other drawbacks of prior proposals by providing a novel and improved trap of simple but extremely sturdy construction which employs an advantageously-configured base to provide a balanced mounting of U-shaped jaws, torsion coil springs, and elements of a trigger mechanism.

Traps embodying the preferred practice of the present invention employ a minimal number of parts with all of the parts being simply and sturdily configured to facilitate fabrication and assembly. The trap embodiment illustrated in the drawings is comprised, quite simply, of a base, a pair of jaws, a pair of springs, two trigger mechanism parts, and a few conventional fasteners. Despite its simplicity of construction, the trap incorporates a means for presetting the magnitude of the force that must be applied by an animal to spring the trap, whereby the trap can be adapted for use with a wide variety of animals.

A feature of a trap embodying the preferred practice of the present invention lies in its use of a pair of torsion coil spring members having U-shaped leg portions which not only bias the trap's jaws toward a closed position, but which also serve to forcefully wedge the jaws together once they approach their closed position. Moreover, the springs engage sides of the jaws in such a way that, once the jaws have approached their closed position, they cannot be re-opened by a trapped animal attempting to escape.

Still another feature of the trap design of the present invention resides in the capability of the design to be scaled up or down in size as may be desired to provide traps of a variety of sizes. The dimensional proportions of the components of the trap illustrated in the accompanying drawings may be employed in relatively small traps for such small fur-bearing animals as muskrats and raccoons, as well as in relatively large traps for such sizable fur-bearing animals as Alaskan wolves.

These and other features and a fuller understanding of the invention may be had by referring to the following detailed description and claims taken in conjunction with the accompanying drawings.

DESCRIPTION OF THE PREFERRED EMBODIMENT

Figure 1:
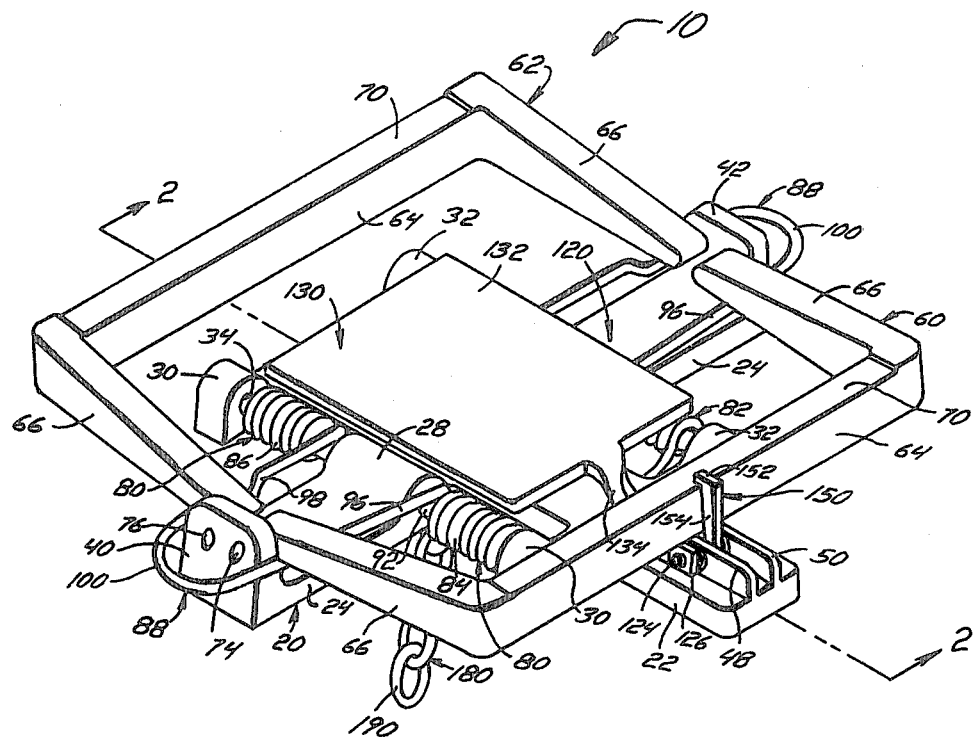
FIG. 1 is a perspective view of a trap embodying the preferred practice of the present invention, with jaws of the trap in their set position.

Referring to FIGS. 1–5, a trap embodying the preferred practice of the present invention is indicated generally by the numeral 10. The trap 10 includes a base 20, a pair of U-shaped jaws 60, 62 which are pivotally mounted on the base 20, a pair of torsion coil springs 80, 82 which bias the jaws 60, 62 toward a jaw-closed position (shown in FIGS. 3–5), and a trigger mechanism 120 for releasably retaining the jaws 60, 62 in a set position (shown in FIGS. 1 and 2). The trigger mechanism 120 includes a lever-supported pan 130 and a latch lever 150, both of which are pivotally mounted on the base 20. A tie-down connector assembly 180 makes a swivel connection with the base 20. These and other components of the trap will be described in greater detail following a brief overview of the operation of the trap 10.

The trap 10 is set by pivoting upstanding U-shaped portions 88 of the springs 80, 82 downwardly to permit the jaws 60, 62 to move to their set positions (shown in FIGS. 1 and 2), and by moving the trigger pan and latch lever 130, 150 to enable the latch lever 150 to hook over and engage the jaw 60. The trap 10 is sprung by depressing the pan 130. As the pan 130 is depressed, the latch lever 150 is caused to disengage the jaw 60, whereupon the springs 80, 82 quickly snap the jaws 60, 62 upwardly toward their closed position. As the jaws 60, 62 approach their closed position, the springs 80, 82 engage opposite sides of the jaws 60, 62 and wedge the jaws 60, 62 closed while, at the same time, positively preventing the jaws 60, 62 from being reopened by a trapped animal.

Figure 6:
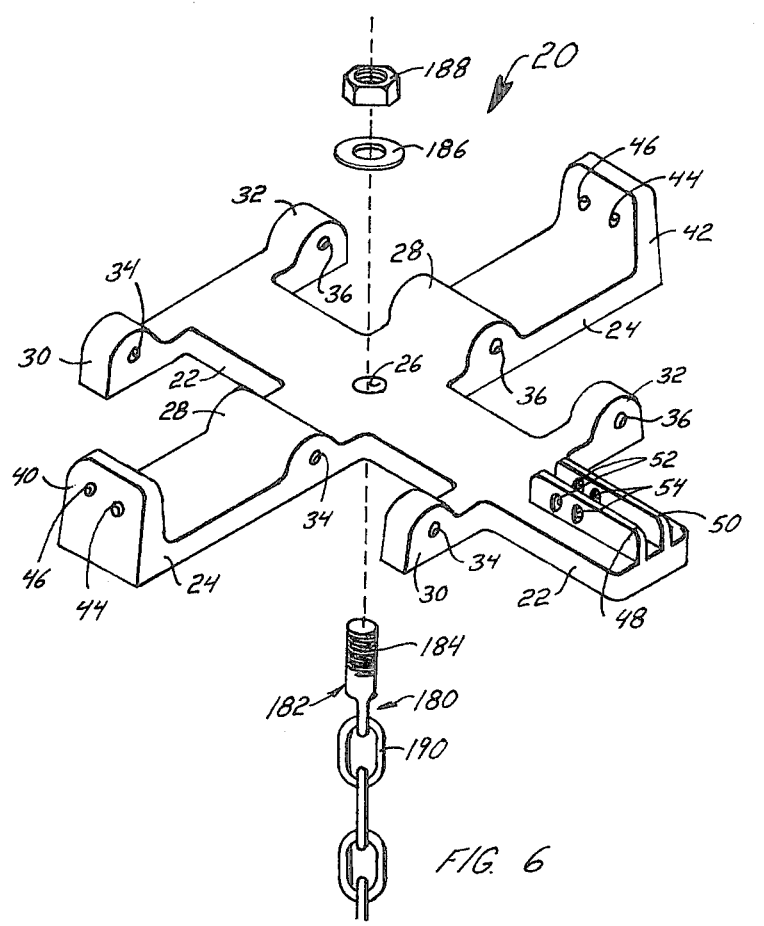

Referring to FIG. 6, the base 20 is of generally X-shaped configuration, having an elongate main stem 22 intersected by an elongate, integrally-formed cross-arm 24. A hole 26 is formed through the base 20 at the intersection of the main stem 22 and the cross-arm 24. The hole 26 has an axis which orthogonally intersects the common plane of the main stem 22 and the cross arm 24.

The cross-arm 24 has two enlarged formations 28 located on opposite sides of the main stem 22. Two pairs of side projections 30, 32 extend from opposed sides of the main stem 22 at locations spaced from the cross-arm 24. Two sets of aligned holes 34, 36 are formed through the formations 28 and the projections 30, 32. The holes 34, 36 define a pair of axes which parallel the main stem 22.

The cross-arm 24 has upwardly-extending end portions 40, 42. Two sets of aligned holes 44, 46 are formed through the end portions 40, 42. The holes 44, 46 define a pair of axes which parallel the cross-arm 24.

The main stem 22 has a pair of spaced, upstanding flanges 48, 50 located near one of its ends. The flanges 48, 50 are elongate and parallel the length of the main stem 22. Two sets of aligned holes 52, 54 are formed through the flanges 48, 50. The holes 52, 54 define a pair of axes which parallel the cross-arm 24.

Figure 2:
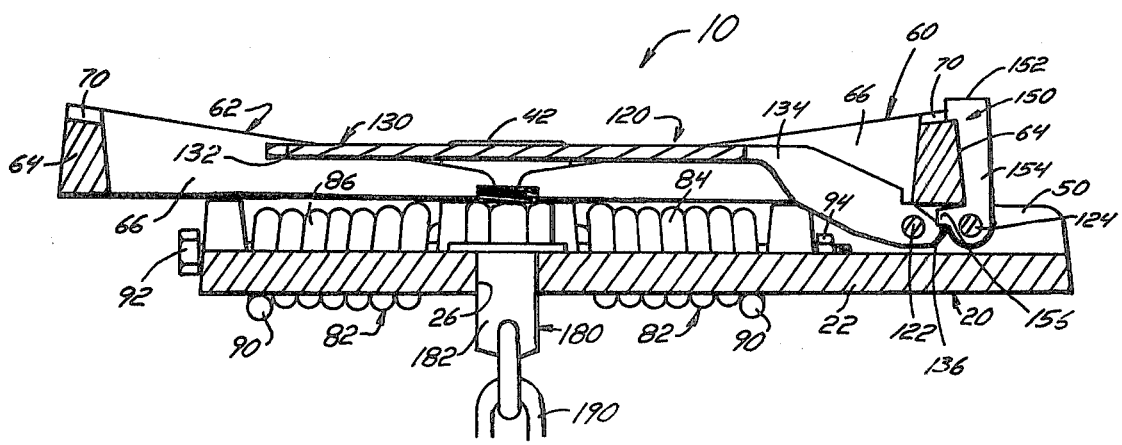
FIG. 2 is a sectional view as seen from a plane indicated by a line 2—2 in FIG. 1.
Figure 3:
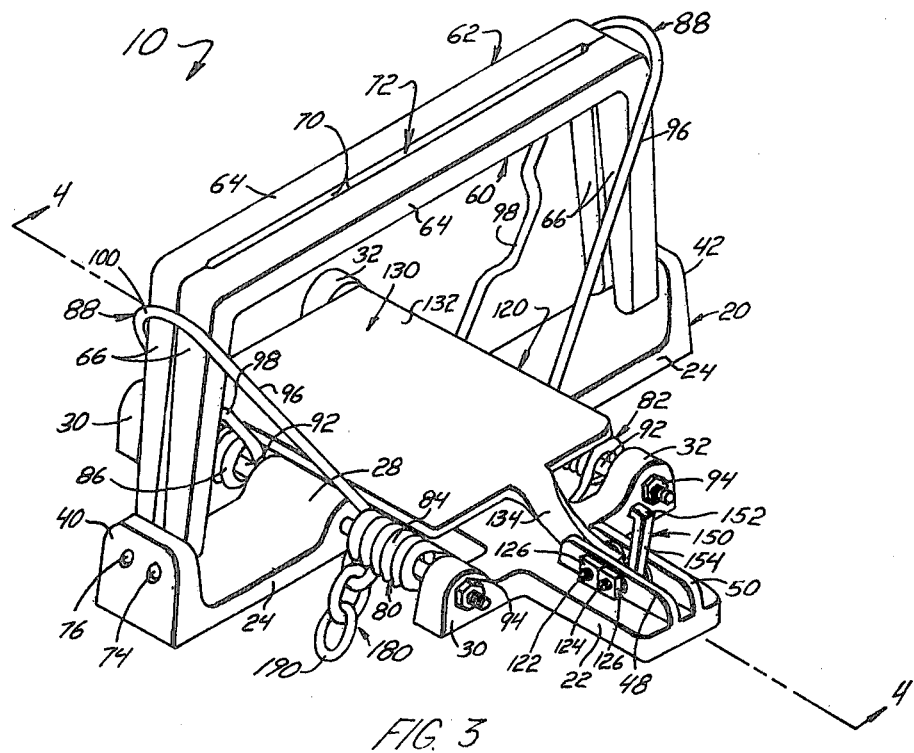
FIG. 3 is a perspective view similar to FIG. 1 but with the jaws in their closed position.
Figure 4:
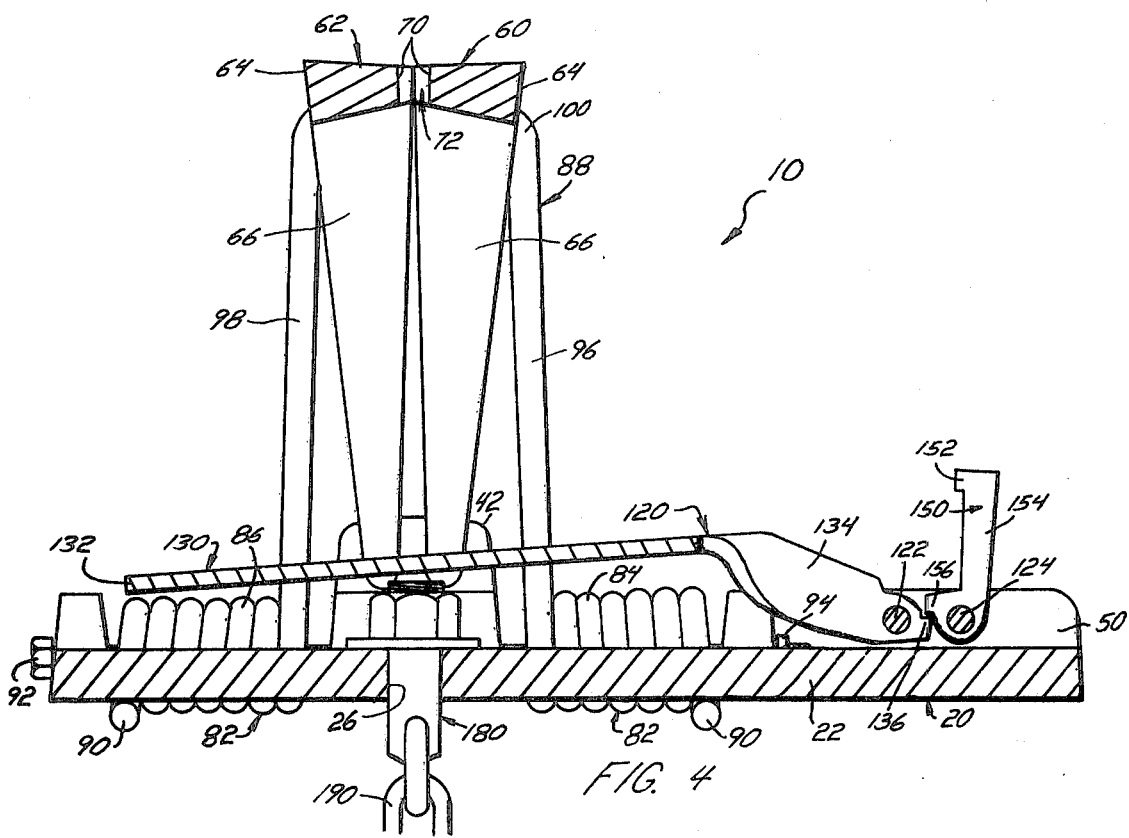
FIG. 4 is a sectional view as seen from a plane indicated by a line 4—4 in FIG. 3.
Figure 5:
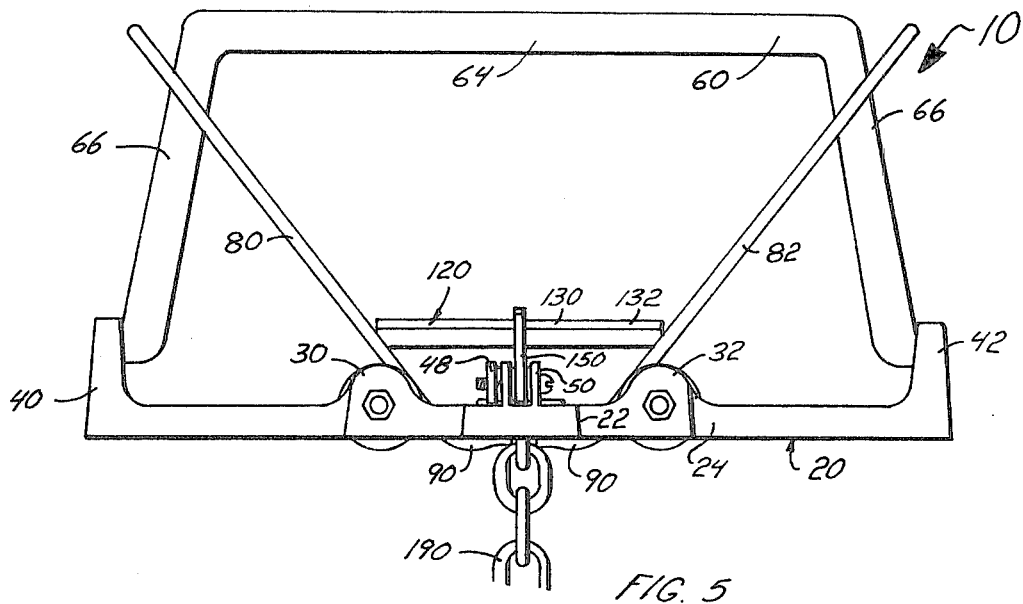
FIG. 5 is an end elevational view of the trap with the jaws of the trap in their closed position; and, FIG. 6 is an exploded perspective view of a base and a tie-down connector employed in the trap of FIGS. 1–5.

Referring to FIGS. 1-5, the U-shaped jaws 60, 62 comprise identical structures, each having a central bar 64 which extends parallel to the cross-arm 24, and a pair of legs 66 which extend from opposite ends of the central bar 64 toward the upstanding end portions 40, 42 of the cross-arm 24. Portions of the central bars 64 are relieved, as indicated by numerals 70, to define a space 72, as shown in FIGS. 3 and 4, between the relieved portions 70 of the bars 64 when the jaws 60, 62 are closed. The jaw 60 carries a pair of cylindrical projections, one of which is indicated in the drawings by the numeral 74. The cylindrical projections 74 extend into the holes 44 to pivotally mount the jaw 60 on the base 20. The jaw 62 carries a pair of cylindrical projections, one of which is indicated in the drawings by the numeral 76. The cylindrical projections 76 extend into the holes 46 to pivotally mount the jaw 62 on the base 20.

The torsion coil springs 80, 82 comprise left and right structures having configurations which are mirror images of each other. Each of the springs 80, 82 has two coiled portions 84, 86 located on opposite sides of a U-shaped central portion 88, and opposite end portions 90 which underlie the main stem 22. The coiled portions 84, 86 of the spring 80 are aligned with the axis of the holes 34, and a mounting rod in the form of a threaded fastener 92 extends therethrough for mounting the spring 80 on the base 20. The coiled portions 84, 86 of the spring 82 are aligned with the axis of the holes 36, and a mounting rod in the form of a threaded fastener 92 extends therethrough for mounting the spring 82 on the base 20. Locking nuts 94 secure the fastener 92 in place.

The U-shaped central portions 88 of the springs 80, 82 each have one straight side 96, and one dog-legged side 98. The straight sides 96 underlie the legs 66 of the jaw 60 when the trap 10 is set. The dog-legged sides 98 underlie the legs 66 of the jaw 62 when the trap 10 is set. The dog-legged sides 98 are configured to properly position the jaw 62 when the trap 10 is set. The U-shaped central portions 88 of the springs 80, 82 have semi-circular portions 100 which wedgingly clamp the legs 66 of the jaws 60, 62 together when the trap 10 is sprung.

The trigger mechanism 120 includes a pair of threaded fasteners 122, 124 which pivotally mount the lever-supported pan 130 and the keeper 150 on the base 20. The fasteners 122, 124 extend through the holes 52, 54 and through aligned holes formed in the pan 130 and the keeper 150, and are secured in place by nuts 126.

The lever-supported pan 130 serves as the sensing device which initiates the springing of the trap 10. The pan 130 has a relatively large, rectangular plate portion 132 which is engageable by an animal's foot, and an elongate arm 134 which extends into the space between the flanges 48, 50. An operating projection 136, best seen in FIGS. 2 and 4, is formed on the arm 134 for engaging and moving the keeper 150.

The keeper 150 has a hook-shaped upper end 152 atop an elongate stem 154 which extends between the flanges 48, 50. An operating lug 156 is provided on the stem 154 for cooperating with the operating projection 136 on the supporting arm 134 of the pan 130. The operating projection 136 and the lug 156 are configured such that, when the pan 130 is depressed from its set position shown in FIGS. 1 and 2, the operating projection 136 will engage the lug 156 to force the keeer out of retaining engagement with the jaw 60, as is illustrated in FIG. 4, whereupon the jaws 60, 62 will be closed by the springs 80, 82.

While trigger mechanism 120 operates to releasably position both of the jaws 60, 62 in their set position, the latch lever 150 actually engages only the jaw 60. When the jaw 60 is held in its set position by the latch lever 150, the U-shaped portions of the springs 80, 82 are held downwardly by the legs 66 of the jaw 60, and the dog-legged arms 98 of the springs 80, 82 underlie and support the jaw 62 in its set position.

Referring to FIG. 6, the tie-down assembly 180 includes an eye-bolt 182 which has a threaded portion 184 which extends in a slip-fit through the hole 26 in the base 20. A washer 186 and a locking nut 188 are installed on the threaded portion 184 to secure the eye-bolt 182 in place while establishing a swivel connection between the eye-bolt 182 and the base 20. A welded-link chain 190 connects with the eye-bolt 182 and provides a means by which the trap 10 can be secured to a stake or other suitable stationary object (not shown).

A feature of the trap 10 lies in the relatively symmetrical manner in which its various components are mounted about the base 20, whereby the trap is well "balanced" abouts its center pull connection with the tie-down chain 190. An animal caught in the trap 10 and seeking to escape by pulling away from the trap 10 will cause the trap 10 to be oriented such that the axis of the eye-bolt 182 will be aligned with the hole 26 and with the tie-down chain 190 as the animal seeks to pull itself free. With the trap so oriented its components are sufficiently symmetrically arranged about the axis of the eye-bolt 182 that their weight will not impose unbalance forces on the animal that would tend to cause undue injury.

A further feature of the trap 10 lies in the provision of a means for presetting the magnitude of the force an animal must apply to the lever-supported pan 130 to spring the trap 10. The fastener 122 may be tightened or loosened to vary the pressure with which the upstanding flanges 48, 50 clampingly engage opposite sides of the elongate arm 134. Similarly, the fastener 124 may be tightened or loosened to vary the pressure with which the upstanding flanges 48, 50 engage opposite sides of the keeper stem 154. By adjusting the fasteners 122, 124, the force required to pivot the lever-supported pan 130 and the keeper 150 to spring the trap 10 can be controlled accurately within a sufficiently wide range to enable the trap 10 to be sprung with anything between a very minimal application of force to the force that would be expected to be exerted by the leg of a heavy animal such as an Alaskan wolf.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. An animal trap, comprising:
   (a) base means for:
      (i) defining first and second pairs of jaw-mounting formations, the formations of the first pair being located near opposite sides of the base means and extending along a first jaw-mounting axis, the formations of the second pair being located near the same opposite sides of the base means and extending along a second jaw-mounting axis, the first and second jaw-mounting axes extending substantially parallel to each other;
      (ii) defining first and second sets of spring-mounting formations, with the formations of each set including a central formation and a pair of end formations located on opposite sides of the central formation and spaced therefrom, the formations of the first set having a first set of aligned holes formed therethrough and extending along a first spring-mounting axis, the formations of the second set having a second set of aligned holes formed therethrough and extending along a second spring-mounting axis, the first and second spring-mounting axes extending substantially parallel to each other and extending transverse to the first and second jaw-mounting axes;
   (b) first and second U-shaped jaws each having mounting formations on opposite ends thereof, the mounting formations on the first jaw cooperating with the first pair of jaw-mounting formations on the base means to pivotally mount the first jaw on the base means for movement about the first jaw-mounting axis, the mounting formations on the second jaw cooperating with the second pair of jaw-mounting formations on the base means to pivotally mount the second jaw on the base means, the jaws being movable between a set position wherein they extend in a substantially horizontal plane, and a closed position wherein the jaws are upstanding with portions thereof extending closely alongside each other;
   (c) first and second spring means for biasing the first and second jaws toward their closed position, wherein:
      (i) the first spring means has a pair of spaced coiled portions extending along the first spring-mounted axis with one of its coiled portions positioned between the central formation and one of the end formations of the first set of spring-mounted formations, and with the other of its coiled portions positioned between the central formation and the other of the end formations of the first set of spring-mounting formations;
      (ii) the second spring means has a second pair of spaced coiled portions extending along the second spring-mounting axis with one of its coiled portions positioned between the central formation and one of the end formations of the second set of spring-mounting formations, and with the other of its coiled portions positioned between the central formation and the other of the end formations of the second set of spring-mounting formations; and
      (iii) each of the first and second spring means includes U-shaped formation means formed integrally with and interconnecting its associated pair of coiled portions, with each of the U-shaped formations being configured (1) to engage the first and second jaws to support the first and second jaws in their set position, (2) to engage opposed faces of the first and second jaws as the first and second jaws approach their closed position to prevent the first and second jaws from being spread apart by separating force applied to the first and second jaws; and,
   (d) first elongate rod means extending through the first set of aligned holes and through the coiled portions of the first spring means for mounting the first spring means on the base means, and second elongate rod means extending through the second set of aligned holes and through the coiled portions of the second spring means for mounting the second spring means on the base means;
   (e) trigger means carried on the base means for selectively retaining the jaws in their set position, and for selectively releasing the jaws to permit the first and second spring means to bias the jaws toward their closed position;
   (f) connector means coupled to the base means for securing the trap to a stationary object;
   (g) each of the U-shaped formation means, of (c) (iii), having a curved part interconnecting a pair of leg parts;
   (h) each of the first and second spring means having a pair of end parts each being connected to a separate one of the coiled portions and extending into contact with the base means;
   (i) the leg parts of the U-shaped formation means, of (c) (iii), engaging and biasing the first and second jaws toward their closed positions;
   (j) the curved parts of the U-shaped central portions of the first and second spring means being configured:
      (i) to engage the first and second jaws as the jaws approach their closed position; and,
      (ii) the curved parts operate to wedge the jaws toward their closed position once the jaws have approached their closed position;
   (k) the leg parts of the first and second spring means being configured such that, at the same time that the curved parts of the U-shaped central portions are wedging the jaws toward their closed positions, the leg parts are positioned to lie alongside the jaws to prevent the jaws from being opened by an animal trapped between the jaws;
   (l) the trigger means including structure for releasably engaging only the first jaw means to selectively retain the jaws in their set position;
   (m) the leg parts of each of the first and second spring means including one substantially straight leg for engaging the first jaw, and one dog-legged leg part for engaging the second jaw; and, (n) the dog-legged leg part being configured to position the second jaw in substantially the same horizontal plane with the first jaw when the jaws are in their set position.

2. The animal trap of claim 1 wherein the curved parts of the U-shaped formation means are configured to engage the first and second jaws as the jaws approach their closed position to wedge the first and second jaws toward their closed position once the jaws have closely approached their closed position.

3. The animal trap of claim 2 wherein the leg parts of the U-shaped formation means are configured such that, at the same time the curved parts are wedging the first and second jaws toward their closed positions, the leg parts are positioned to lie alongside opposed faces of the first and second jaws to prevent the jaws from being opened by an animal trapped between the jaws.

4. An animal trap, including:
(a) base means for:
  (i) defining first and second pairs of jaw-mounting formations, the formations of the first pair being located near opposite sides of the base means and extending along a first jaw-mounting axis, the formations of the second pair being located near the same opposite sides of the base means and extending along a second jaw-mounting axis, with the first and second jaw-mounting axes extending substantially parallel to each other;
  (ii) defining first and second sets of spring-mounting formations, with the formations of each set including a central formation and a pair of end formations located on opposite sides of the central formation and spaced therefrom, the formations of the first set having a first set of aligned holes formed therethrough and extending along a first spring-mounting axis, the formations of the second set having a second set of aligned holes formed therethrough and extending along a second spring-mounting axis, the first and second spring-mounting axes extending substantially parallel to each other and extending transverse to the first and second jaw-mounting axes;
(b) first and second U-shaped jaws each having mounting formations near opposite ends thereof, the mounting formations on the first jaw cooperating with the first pair of jaw-mounting formations on the base means to pivotally mount the first jaw on the base means for movement about the first jaw-mounting axis, the mounting formations on the second jaw cooperating with the second pair of jaw-mounting formations on the base means to pivotally mount the second jaw on the base means, the jaws being movable between a set position wherein they extend in a substantially horizontally plane, and a closed position wherein the jaws are upstanding with portions thereof extending closely alongside each other;
(c) first and second spring means (1) for supporting the first and second jaws in their set position, (2) for biasing the first and second jaws toward their closed position, (3) for wedgingly engaging the first and second jaws to wedge as well as bias the first and second jaws toward their closed position as the first and second jaws approach their closed position, and (4) for engaging opposed faces of the first and second jaws as the first and second jaws approach their closed position to prevent the first and second jaws from being spread apart by separating force applied to the first and second jaws, wherein:
  (i) the first spring means has a pair of spaced coiled portions extending along the first spring-mounted axis with one of its coiled portions positioned between the central formation and one of the end formations of the first set of spring-mounted formations, and with the other of its coiled portions positioned between the central formation and the other of the end formations of the first set of spring-mounting formations;
  (ii) the second spring means has a second pair of spaced coiled portions extending along the second spring-mounting axis with one of its coiled portions positioned between the central formation and one of the end formations of the second set of spring-mounting formations, and with the other of its coiled portions positioned between the central formation and the other of the end formations of the second set of spring-mounting formations; and,
  (iii) each of the first and second spring means includes U-shaped formation means formed integrally with and interconnecting its associated pair of coiled portions, with each of the U-shaped formations being configured (1) to engage the first and second jaws to support the first and second jaws in their set position, (2) to engage opposed faces of the first and second jaws as the first and second jaws approach their closed position to prevent the first and second jaws from being spread apart by separating force applied to the first and second jaws; and,
  (iv) each of the coiled portions being connected to the base means and being operable to bias its associated U-shaped formation means into engagement with the first and second jaws so that the first and second spring means are also operable (1) to bias the first and second jaws toward their closed position, and (2) to wedgingly engage the first and second jaws as the first and second jaws approach their closed positions; and
  (v) each of the formation means has a curved part interconnecting a pair of leg parts, each of the coiled portions has an end part which extends into contact with the base means, and the leg parts of the U-shaped formation means engage and bias the first and second jaws toward their closed positions during at least a majority of the range of movement of the first and second jaws from their set positions to their closed positions; and and
  (vi) at least one or each of the leg parts of at least one of the U-shaped formation means has a dog-legged formation which underlies and engages a selected one of of the jaws to at least assist in supporting the selected jaw when the selected jaw is in its set position;
(d) first elongate rod means extending through the first set of aligned holes and through the coiled portions of the first spring means for mounting the first spring means on the base means, and second elongate rod means extending through the second set of aligned holes and through the coiled portions of the second spring means for mounting the second spring means on the base means;
(e) trigger means carried on the base means for selectively retaining at least one of the jaws in its set position, and for selectively releasing said at least one of the retained jaws to permit the first and second spring means to move the jaws from their set position toward their closed position; and, (f) connector means coupled to the base means for securing the trap to a stationary object.

5. An animal trap, comprising:
(a) base means for:
  (i) defining first and second pairs of jaw-mounting formations, the formations of the first pair being located near opposite sides of the base means and extending along a first jaw-mounting axis, the formations of the second pair being located near the same opposite sides of the base means and extending along a second jaw-mounting axis, the first and second jaw-mounting axes extending substantially parallel to each other;
  (ii) defining first and second sets of spring-mounting formations, with the formations of each set including a central formation and a pair of end formations located on opposite sides of the central formation and spaced therefrom, the formations of the first set having a first set of aligned holes formed therethrough and extending along a first spring-mounting axis, the formations of the second set having a second set of aligned holes formed therethrough and extending along a second spring-mounting axis, the first and second spring-mounting axes extending substantially parallel to each other and extending transverse to the first and second jaw-mounting axes;
(b) first and second U-shaped jaws each having mounting formations on opposite ends thereof, the mounting formations on the first jaw cooperating with the first pair of jaw-mounting formations on the base means to pivotally mount the first jaw on the base means for movement about the first jaw-mounting axis, the mounting formations on the second jaw cooperating with the second pair of jaw-mounting formations on the base means to pivotally mount the second jaw on the base means, the jaws being movable between a set position wherein they extend in a substantially horizontal plane, and a closed position wherein the jaws are upstanding with portions thereof extending closely alongside each other;
(c) first and second spring means connected to the base means for biasing the first and second jaws toward their closed position;
(d) first elongate rod means extending through the first set of aligned holes and connected to the first spring means for mounting the first spring means on the base means, and second elongate rod means extending through the second set of aligned holes and connected to the second spring means for mounting the second spring means on the base means;
(e) trigger means carried on the base means for selectively retaining the jaws in their set position, and for selectively releasing the jaws to permit the first and second spring means to bias the jaws toward their closed position;
  (i) the said trigger means includes a pan-shaped member having an elongate lever arm and a keeper member, both of which are pivotally connected between a pair of upstanding flanges on the base means;
  (ii) the keeper member carries a hook-shaped means for engaging and releasably retaining at least a selected one of the jaws over the outside jaw edge in its set position;
  (iii) the pan-shaped member has an actuating portion configured to be positioned between the first and second jaws when the jaws are in their set position;
  (iv) the lever arm of the pan-shaped member carries formation means for engaging the keeper member on a lug at a position beneath the jaws to pivot the keeper member and spring the trap by moving the keeper member out of engagement with the selected one of the jaws when the pan-shaped member is depressed at a time when the keeper member is retaining the selected one of the jaws in its set position; and,
  (v) adjustment means is provided for compressing the upstanding flanges on the base means and adjustingly clamping the keeper member and lever arm to preset the force which must be applied to the pan-shaped member to spring the trap; and,
(f) connector means coupled to the base means for securing the trap to a stationary object.

* * * * *